(12) United States Patent
Kim (10) Patent No.: US 11,524,542 B2
(45) Date of Patent: Dec. 13, 2022

(54) VEHICLE AND CONTROL METHOD THEREOF

(71) Applicants: Hyundai Motor Company, Seoul (KR); Kia Motors Corporation, Seoul (KR)

(72) Inventor: Hyungjin Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 372 days.

(21) Appl. No.: 16/804,408

(22) Filed: Feb. 28, 2020

(65) Prior Publication Data

US 2021/0053409 A1  Feb. 25, 2021

(30) Foreign Application Priority Data

Aug. 20, 2019 (KR) ........................ 10-2019-0101571

(51) Int. Cl.
*B60G 17/018* (2006.01)
*B60G 17/019* (2006.01)

(52) U.S. Cl.
CPC ... *B60G 17/0182* (2013.01); *B60G 17/01908* (2013.01); *B60G 2400/252* (2013.01); *B60G 2400/821* (2013.01)

(58) Field of Classification Search
None
See application file for complete search history.

(56) References Cited

U.S. PATENT DOCUMENTS

| | | | |
|---|---|---|---|
| 8,762,000 B2 | 6/2014 | Schindler et al. | |
| 10,486,485 B1* | 11/2019 | Levinson | B60G 17/0162 |
| 10,828,955 B1* | 11/2020 | Edren | B60G 17/0528 |
| 2014/0222287 A1* | 8/2014 | Popham | B60G 17/0165 |
| | | | 701/37 |
| 2019/0232748 A1* | 8/2019 | Mohamed | B60G 17/0165 |

FOREIGN PATENT DOCUMENTS

KR   10-2019-0128290 A   11/2019

* cited by examiner

*Primary Examiner* — Navid Z. Mehdizadeh
(74) *Attorney, Agent, or Firm* — Morgan, Lewis & Bockius LLP

(57) ABSTRACT

A vehicle may include a sensor configured to acquire detecting data including front road surface information; a suspension including a spring and a damper; and a controller including a processor and a memory; wherein the controller is configured to identify an unevenness of the front road surface based on the detecting data and control the suspension based on damping force setting information corresponding to the unevenness when the vehicle reaches the unevenness.

6 Claims, 8 Drawing Sheets

| BUMP TYPE ||
|---|---|
| ⌒ | FIRST TYPE |
| ⌒ | SECOND TYPE |
| ⌒ | THIRD TYPE |
| ⌒ | FOURTH TYPE |
| ▭ | FIFTH TYPE |

<VEHICLE MOTION WHEN DRIVING 30 KPH IN THIRD TYPE>

FIG. 10

<IMPACT FORCE WHEN DRIVING 30 KPH IN THIRD TYPE>

VEHICLE AND CONTROL METHOD THEREOF

CROSS-REFERENCE TO RELATED APPLICATION

This application claims priority to and the benefit of Korean Patent Application No. 10-2019-0101571, filed on Aug. 20, 2019 in the Korean Intellectual Property Office, the disclosure of which is incorporated by reference in its entirety.

BACKGROUND OF THE PRESENT INVENTION

Field of the Invention

The present invention relates to a vehicle and a control method thereof capable of reducing the movement and impact of the vehicle when the vehicle passes through unevenness on the road surface.

Description of Related Art

Suspension is a device including spring, damper, etc. Suspension improves driving stability and turning characteristics while improving ride comfort by absorbing the impact from the road surface. The damper's characteristics (hard or soft) may be adjusted according to the road conditions while driving.

However, in the conventional suspension technology, since the suspension is controlled at the instant of exceeding the bump or the like, there is a problem in reducing the vibration of the vehicle and absorbing the impact. When the driver passes through the unevenness at a high speed in a state in which the driver does not recognize the unevenness (bump, pothole, etc.) of the road, the suspension does not absorb the impact, reducing the ride comfort.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle and a control method thereof configured for identifying unevenness on a front road surface using a sensor configured for acquiring road surface information and controlling a suspension using damping force setting information corresponding to the identified unevenness, and a control method thereof.

In accordance with an aspect of the present invention, a vehicle includes: a sensor configured to acquire detecting data including front road surface information; a suspension including a spring and a damper; and a controller including a processor and a memory; wherein the controller is configured to identify an unevenness of the front road surface based on the detecting data and control the suspension based on damping force setting information corresponding to the unevenness when the vehicle reaches the unevenness.

The controller is configured to estimate a length and a height of the unevenness based on the detecting data and acquire the damping force setting information corresponding to the estimated length and the estimated height of the unevenness from the memory.

The damping force setting information includes first data about a plurality of control sections set based on the length and the height of the unevenness and second data about damping force set for each of the plurality of control sections.

The controller is configured to control the suspension based on the damping force set for each of the plurality of control sections while passing through the unevenness.

The controller is configured to control the suspension to reduce the damping force in a boundary section between the road surface and a bump when the unevenness is the bump.

The controller is configured to control the suspension to increase the damping force in an intermediate section located between boundary sections between the road surface and a bump when the unevenness is the bump.

The controller is configured to control the suspension to increase the damping force in an entry section of a pothole when the unevenness is the pothole and control the suspension to reduce the damping force in an escape section of the pothole when the impact is expected in the escape section of the pothole.

The controller is configured to estimate the distance to the unevenness and the time to reach the unevenness.

In accordance with an aspect of the present invention, a control method of a vehicle includes: acquiring detecting data including front road surface information; Identifying an unevenness of the front road surface based on the detecting data; and controlling the suspension based on damping force setting information corresponding to the unevenness when the vehicle reaches the unevenness.

The control method may further include estimating the length and the height of the unevenness based on the detecting data; and acquiring the damping force setting information corresponding to the estimated length and the estimated height of the unevenness from the memory.

The damping force setting information includes first data about a plurality of control sections set based on the length and the height of the unevenness and second data about damping force set for each of the plurality of control sections.

The controlling the suspension includes: controlling the suspension based on the damping force set for each of the plurality of control sections while passing through the unevenness.

The controlling the suspension includes: controlling the suspension to reduce the damping force in a boundary section between the road surface and a bump when the unevenness is the bump.

The controlling the suspension includes: controlling the suspension to increase the damping force in an intermediate section located between boundary sections between the road surface and a bump when the unevenness is the bump.

The controlling the suspension includes: controlling the suspension to increase the damping force in an entry section of a pothole when the unevenness is the pothole; and controlling the suspension to reduce the damping force in an escape section of the pothole when the impact is expected in the escape section of the pothole.

The identifying the unevenness includes: estimating the distance to the unevenness and the time to reach the unevenness.

In accordance with an aspect of the present invention, a vehicle includes: a sensor configured to acquire detecting data including front road surface information; a suspension including a spring and a damper; at least one processor electrically connected to the sensor and the suspension; and a memory electrically connected to the at least one processor, wherein the memory is configured to store at least one instruction configured to cause the processor to identify unevenness on a front road surface based on the detecting data and to control the suspension based on damping force setting information corresponding to the unevenness when the vehicle reaches the unevenness.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Like reference numerals refer to like elements throughout the specification. Not all elements of embodiments of the present invention will be described, and description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Furthermore, when a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Hereinafter, the operation principles and embodiments of the present invention will be described with reference to the accompanying drawings.

Figure 1:
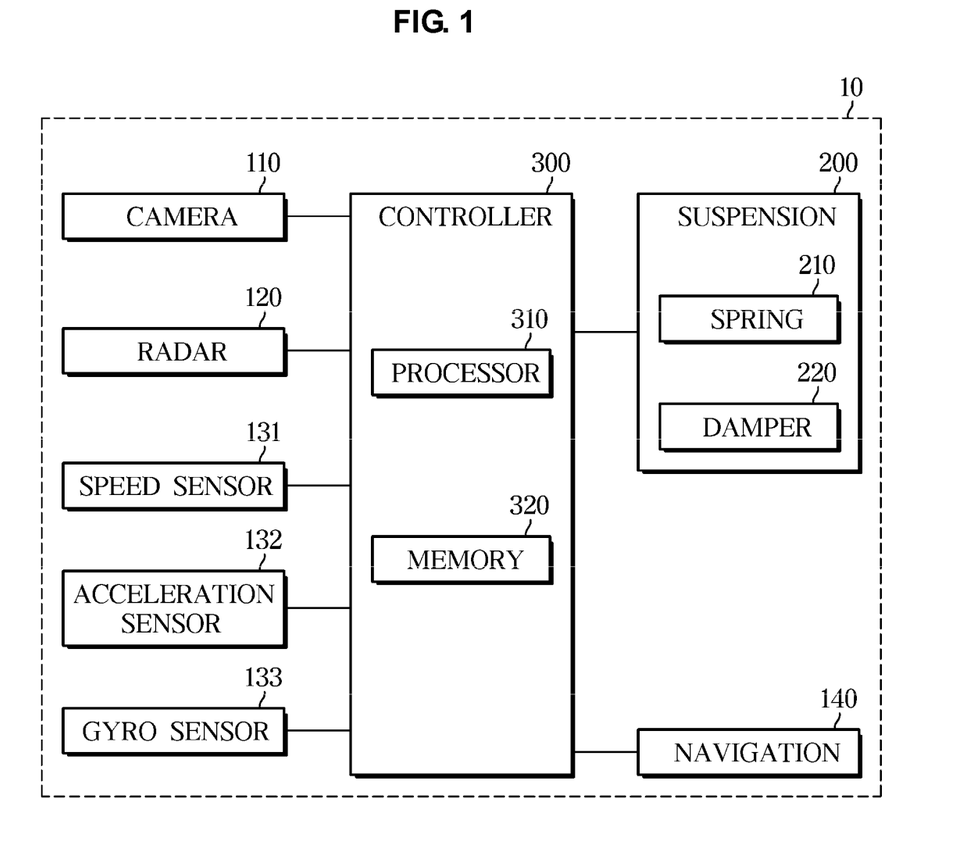
FIG. 1 is a control block diagram of a vehicle according to an exemplary embodiment of the present invention.

FIG. 1 is a control block diagram of a vehicle according to an exemplary embodiment of the present invention.

Referring to FIG. 1, a vehicle 10 according to an exemplary embodiment of the present invention may include a camera 110, a radar 120, various sensors 131, 132, and 133, a navigation 140, a suspension 200, and a controller 300. The controller 300 may control various devices included in the vehicle 10.

The vehicle 10 includes an engine and a transmission. The engine includes a cylinder and a piston and can generate power for the vehicle 10 to travel. The transmission includes a plurality of gears and can transmit power generated by the engine to the wheels. The braking device may slow the vehicle 10 or stop the vehicle 10 through friction with the wheels. The steering apparatus may change the driving direction of the vehicle 10.

The vehicle 10 may include a plurality of electrical components. For example, the vehicle 10 includes an engine management system (EMS), a transmission control unit (TCU), an electronic brake control module, an electronic power steering (EPS), Body Control Module (BCM), and Driver Assistance System (DAS).

The engine management system may control the engine in a response to the driver's acceleration will through the accelerator pedal or a request from the driver assistance system. For example, the engine management system may control the torque of the engine. The transmission control unit may control the transmission in a response to the driver's shift command through the shift lever and/or the traveling speed of the vehicle 10. For example, the transmission control unit may adjust the shift ratio from the engine to the wheels.

The driver assistance system may provide various functions to the driver. For example, the driver assistance system may provide Lane Departure Warning (LDW), Lane Keeping Assist (LKA), High Beam Assist (HBA), Autonomous Emergency Braking (AEB), Traffic Sign Recognition (TSR), Smart Cruise Control (SCC), and Blind Spot Detection (BSD).

The camera 110 may have a field of view facing forward thereof. The camera 110 may photograph the front and acquire image data. For example, the camera 110 may photograph the front road surface to obtain image data regarding the front road surface. The camera 110 may be mounted in the front windshield of the vehicle 10. The image data may include front road surface information related to the vehicle 10 and location information related to a lane. The front road surface information may include unevenness information related to the front road surface.

The camera 110 may be electrically connected to the controller 300. The camera 110 is connected to the controller 300 through a vehicle communication network (NT), or connected to the controller 300 through a hard wire, or connected to the controller 300 through a printed circuit board (PCB). The camera 110 may transmit image data in front of the vehicle 10 to the controller 300.

The radar 120 may include a front radar and a corner radar, and may acquire relative positions and relative speeds of surrounding objects (e.g., other vehicles, pedestrians, cyclists, and the like). The radar 120 may be mounted in a grill and a bumper of the vehicle 10. The radar 120 may obtain radar data from the transmitted radio wave transmitted by the transmitting antenna and the reflected radio wave received by the receiving antenna.

The radar data may include at least one of front road surface information, distance information related to another vehicle located near the vehicle 10, and speed information. The front road surface information may include unevenness information related to the front road surface. The radar 120 may determine a relative distance to the object based on the phase difference (or time difference) between the transmission wave and the reflection wave, and determine the relative speed of the object based on the frequency difference between the transmission wave and the reflection wave. The radar 120 may be connected to the controller 300 through a vehicle communication network NT or a hard wire or a printed circuit board. The front radar 120 may transmit the front radar data to the controller 300.

The radars described above may be implemented in LiDAR.

The sensor may include an image sensor and a non-image sensor. The image sensor may mean the camera 110. Radar 120 and other sensors 131, 132, 133 may be included in the non-image sensor. The detecting data may be defined to include image data obtained by the camera 110, radar data obtained by the radar 120, and detecting data obtained by the other sensors 131, 132, and 133.

For example, the vehicle 10 includes a speed sensor 131 for detecting a speed of a wheel, an acceleration sensor 132 for detecting a lateral acceleration and a longitudinal acceleration of a vehicle, a gyro sensor 133 for detecting a tilt of a vehicle, a yaw rate sensor for detecting a change in the angular velocity of the steering wheel, the steering angle sensor for detecting the rotation and steering angle of the steering wheel. The controller 300 may determine the pitch rate of the vehicle 10 by processing data transmitted from the acceleration sensor 132 and the gyro sensor 133.

The navigation 140 provides the controller 300 with location-based information such as speed bump information and unpaved road information existing on the front road surface through GPS. The navigation 140 may provide the controller 300 with information related to speed bumps on the front road surface. For example, the navigation 140 may provide information related to the distance to the speed bump and the type, length, and height of the speed bump.

The suspension 200 includes a spring 210 and a damper 220 provided in each of the wheels. The suspension 200 is an electronically controlled suspension. The spring 210 reciprocates while compressing or tensioning according to the state of the road surface. The damper 220 is a variable damper that can adjust the damping force. The controller 300 may control the damping force by controlling the suspension 200.

The damper 220 may damp the vibration generated by the spring 210 when the vehicle 10 crosses the obstacle. In other words, the damper 220 may suppress the reciprocation of the spring 210 by providing a force in a direction opposite to the force generated by the spring 210. That is, a force for suppressing the movement of the spring 210 is called a damping force.

The piston rod and the solenoid valve are provided inside the damper 220. The damping force is the resistance generated during the movement of fluid through the flow path formed by the piston rod and the solenoid valve. The damper 220 generates a damping force through a compression stroke and a rebound stroke. According to the movement of the solenoid valve, the width of the flow path, which is the movement path of the fluid, is adjusted, and thus the damping force may be adjusted. The suspension 200 may control the damping force of the damper 220 based on a damping force control command/or a damping force control signal input from the controller 300.

The electronic components may communicate with each other through the vehicle communication network NT. For example, electronic components can send and receive data through Ethernet, Media Oriented Systems Transport (MOST), Flexray, Controller Area Network (CAN), Local Interconnect Network (LIN).

The controller 300 may include a memory 320 for storing programs, instructions, and data for controlling the operation of the vehicle 10 and a processor 310 for generating control signals for controlling the operation of the vehicle 10 based on programs, instructions, and data stored in the memory 320. The processor 310 may include an image signal processor for processing forward image data of the front camera 110 and/or a digital signal processor for processing radar data of the radar 120 and detecting data of the sensors 131, 132, and 133 and/or a micro control unit (MCU) for generating a braking signal and a steering signal. The processor 310 and the memory 320 may be implemented as separate chips or as a single chip. In addition, the controller 300 may include a plurality of processors and a plurality of memories.

The processor 310 may include a logic circuit and an arithmetic circuit, may process data according to a program/instruction provided from the memory 320, and may generate a control signal according to a processing result. The memory 320 may temporarily store image data received from the camera 110 and temporarily store a result of the processor 310 processing the image data. The memory 320 may include a nonvolatile memory such as a flash memory, a read only memory (ROM), and an erasable programmable read only memory (EPROM) in addition to volatile memory such as S-RAM and D-RAM.

Figure 2:
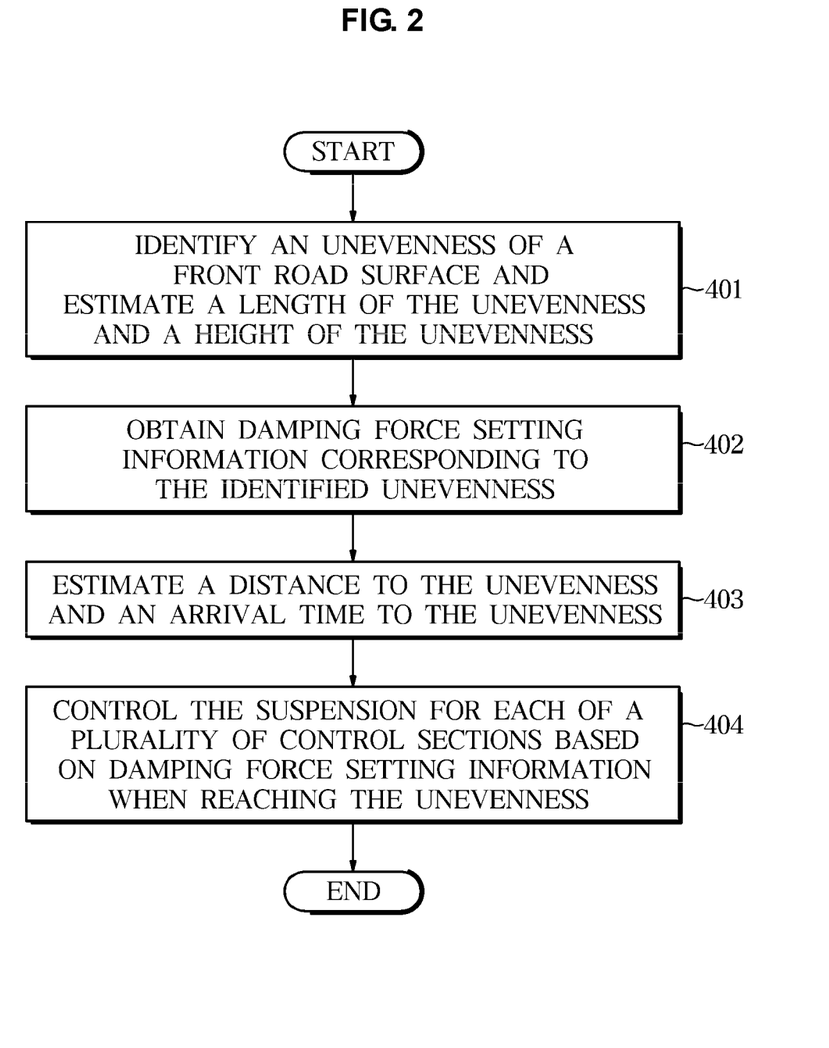
FIG. 2 is a flowchart illustrating a control method of a vehicle according to an exemplary embodiment of the present invention.

FIG. 2 is a flowchart illustrating a control method of a vehicle according to an exemplary embodiment of the present invention.

Referring to FIG. 2, the controller 300 may identify the unevenness of the front road surface based on the detecting data. The controller 300 may identify the unevenness of the front road surface based on the image data obtained by the camera 110. In addition, the controller 300 may identify the unevenness of the front road surface based on the radar data obtained by the radar 120. The controller 300 may identify the unevenness of the front road surface using both image data and radar data.

The controller 300 may estimate the length of the unevenness and the height of the unevenness (401). The controller 300 may obtain damping force setting information corresponding to the identified unevenness from the memory 320 (402). The controller 300 may obtain the damping force setting information corresponding to the estimated length of the unevenness and the height of the unevenness from the memory 320. The damping force setting information includes data relating to a plurality of control sections set based on the length and the height of unevenness, and data relating to damping force set for each of the plurality of control sections.

The controller 300 may control the suspension 200 based on damping force setting information corresponding to the unevenness when the vehicle 10 reaches the unevenness. The controller 300 estimates the distance to unevenness and the arrival time to the unevenness (403). That is, the controller 300 may estimate the timing at which the wheels of the vehicle 10 collide with the unevenness. The controller 300 may control the suspension 200 for each of a plurality of control sections based on damping force setting information while passing through the unevenness from the time when the wheel of the vehicle 10 reaches the unevenness (404).

On the other hand, the controller 300 may independently control the suspension 200 provided on the front wheel of the vehicle 10 and the suspension 200 provided on the rear wheel. For example, when the controller 300 transmits a delay command to the rear suspension, the damping force of the front suspension may be controlled first, and the damping force of the rear suspension may be controlled after a certain time and/or after a certain distance.

Figure 3:
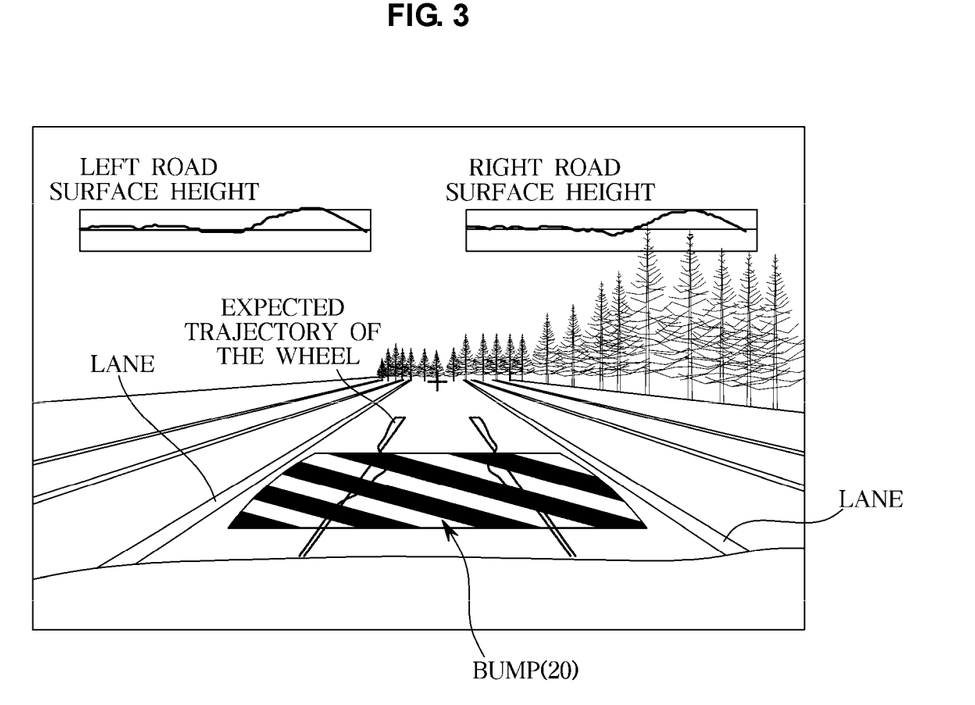
FIG. 3 and FIG. 4 illustrate a method of identifying unevenness on the road surface.
Figure 4:
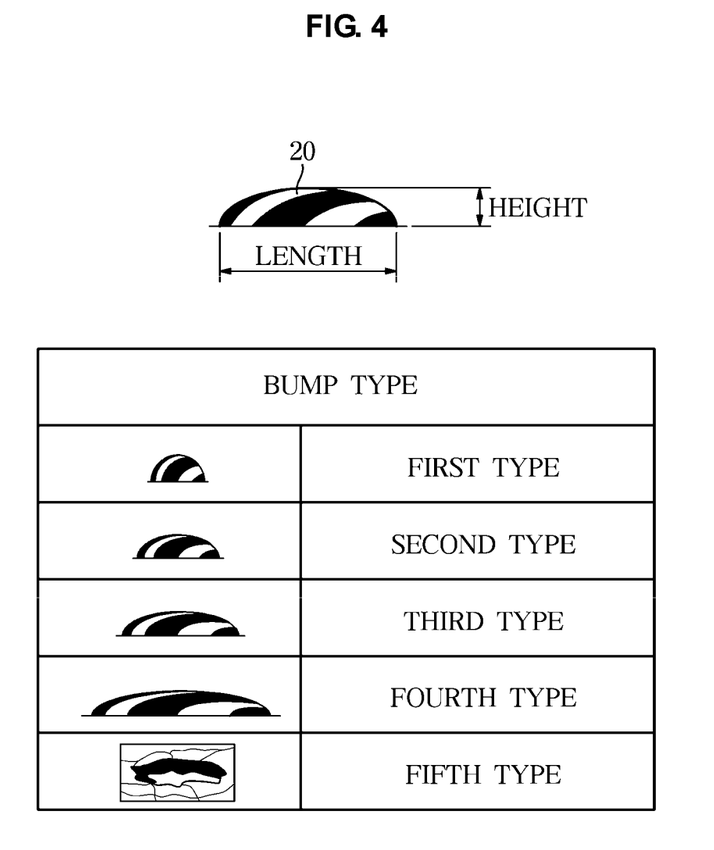

FIGS. 3 and 4 illustrate a method of identifying unevenness on the road surface.

Referring to FIG. 3, the controller 300 may process the image data acquired by the camera 110 to identify unevenness on the front road surface, and estimate the length of the unevenness and the height of the unevenness. In addition, the controller 300 may identify the unevenness of the front road surface and estimate the length of the unevenness and the height of the unevenness based on the radar data obtained by the radar 120. The controller 300 may estimate the length of the unevenness and the height of the unevenness using both the image data and the radar data.

In FIG. 3, unevenness is shown as bump 20. The controller 300 may determine an expected trajectory of the wheel. The expected trajectory of the wheel may be determined by the data provided from the steering sensor. The controller 300 may estimate the left height of the bump 20 along the expected trajectory of the left wheel. In addition, the controller 300 may estimate the right height of the bump 20 along the expected trajectory of the right wheel. The length of the bump 20 may be estimated based on the traveling direction of the vehicle 10.

Referring to FIG. 4, data regarding a plurality of unevenness types is stored in the memory 320 in advance. For example, the plurality of unevenness types may be divided into a first type, a second type, a third type, a fourth type, and a fifth type. The first type, second type, third type and fourth type may each be bumps having different heights and lengths. The height and length may be larger values from the first type to the fourth type. The fifth type may be a pothole. In addition, damping force setting information corresponding to each of the plurality of unevenness types is previously stored in the memory 320.

The controller 300 may compare the unevenness identified by processing image data with a plurality of unevenness types stored in the memory 320, and detect an unevenness type corresponding to the identified unevenness. In addition, the controller 300 may control the suspension 200 by use of damping force setting information corresponding to the detected unevenness type. As described above, the damping force setting information includes data relating to a plurality of control sections set based on the length and the height of unevenness, and data relating to damping force set for each of the plurality of control sections. Accordingly, the setting of the suspension 200 may be predetermined by use of previously stored damping force setting information.

Figure 5:
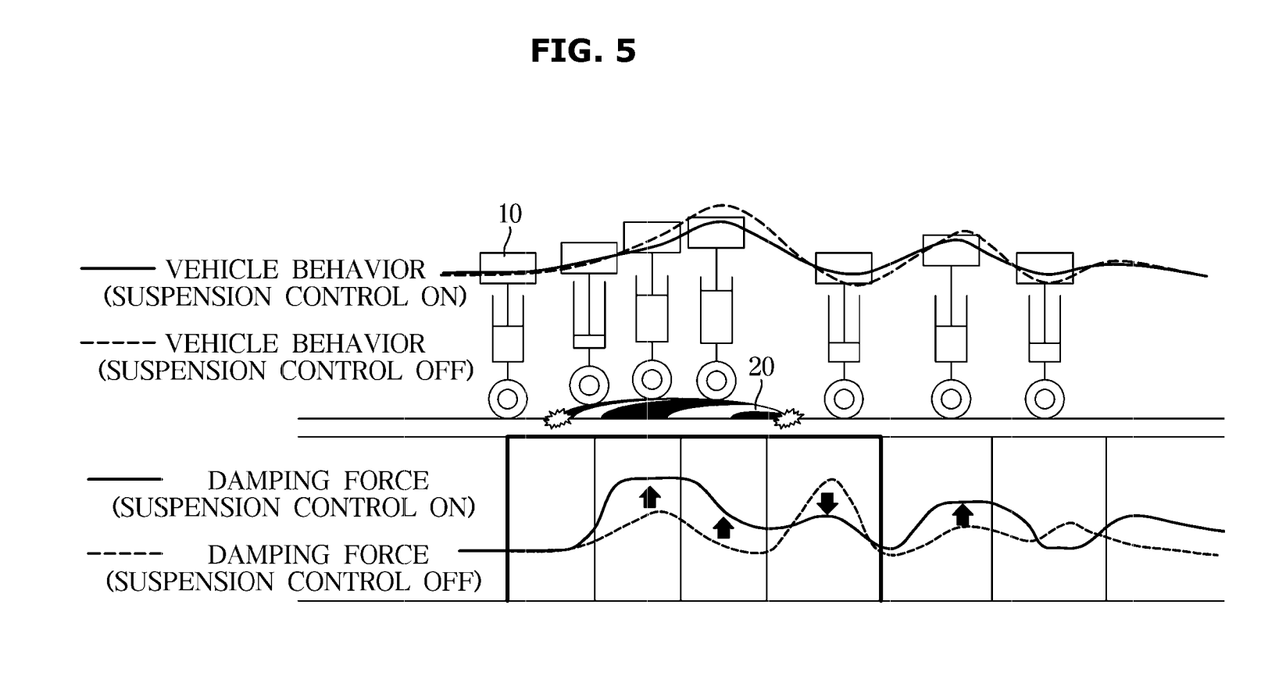
FIG. 5 and FIG. 6 illustrate a method in which damping force is controlled in a plurality of sections when the unevenness is a bump.
Figure 6:
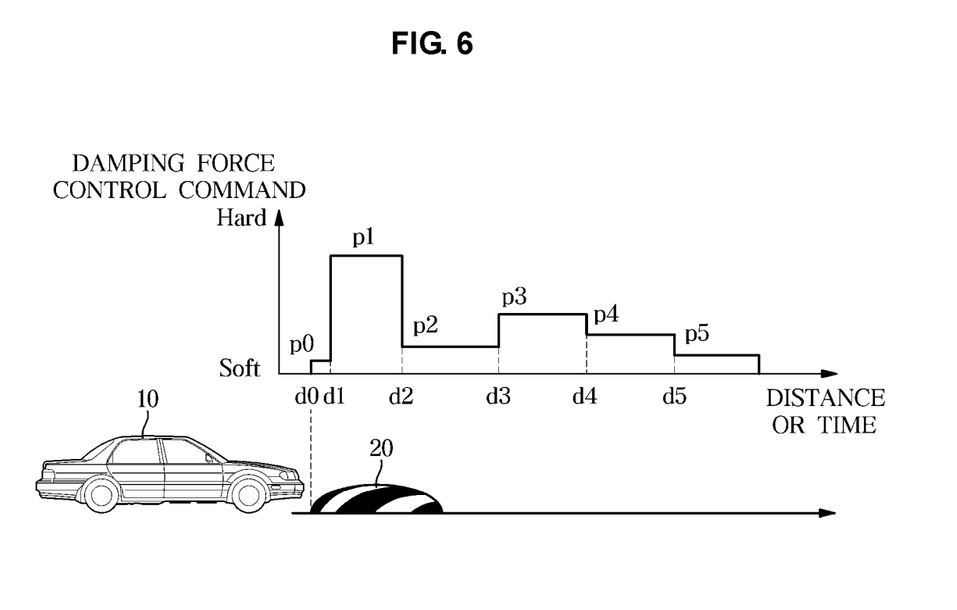
Figure 7:
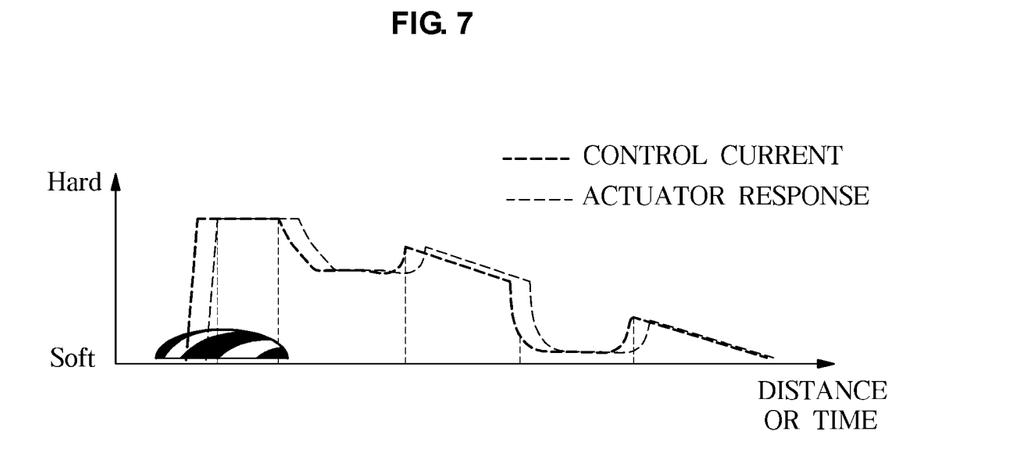
FIG. 7 shows the change in current and the response of the solenoid valve for suspension control when the unevenness is a bump.

FIGS. 5 and 6 illustrate a method in which damping force is controlled in a plurality of sections when the unevenness is a bump. FIG. 7 shows the change in current and the response of the solenoid valve for suspension control when the unevenness is a bump.

Referring to FIG. 5, the controller 300 estimates the distance to the bump 20 and the arrival time to the bump 20, and controls the suspension 200 based on damping force setting information upon reaching the bump 20. The controller 300 controls the suspension 200 for each of a plurality of control sections while passing through the bump 20.

For example, the controller 300 may control the suspension 200 to reduce the damping force in the boundary section between the road surface and the bump 20. When the front wheel of the vehicle 10 meets the first boundary section (d0-d1 in FIG. 6) between the road surface and the entry point of the bump 20, the behavior of the vehicle 10 rises and the spring 210 is compressed. In the instant case, since the impact may be applied to the vehicle 10, the impact may be reduced by reducing the damping force. That is, the controller 300 may operate the suspension 200 in a soft mode.

The controller 300 may control the suspension 200 such that the front wheels of the vehicle 10 increase the damping force in an intermediate section (d1-d2 in FIG. 6) between the road surface and the boundary section of the bump 20. After the wheel of the vehicle 10 passes the road surface and the first boundary section of the bump 20, the vibration of the vehicle 10 may occur greatly. In the instant case, it is possible to reduce the change in behavior of the vehicle 10 by increasing the damping force. That is, the controller 300 may operate the suspension 200 in a hard mode.

When the front wheel of the vehicle 10 meets the road surface and the second boundary section (d2-d3 in FIG. 6) of the escape point of the bump 20, the impact may be applied to the vehicle 10 again. Even in the instant case, the damping force may be reduced to reduce the impact. That is, the controller 300 may operate the suspension 200 again in the soft mode.

Since the vibration of the vehicle 10 may occur even after the rear wheel of the vehicle 10 has completely passed through the bump 20, the controller 300 may reduce the behavior change of the vehicle 10 by increasing the damping force again in the bump 20 escape section (d3-d4 in FIG. 6). In the instant case, the damping force may be smaller than the damping force of the intermediate section (d1-d2 in FIG. 6).

In the subsequent section (after d4 in FIG. 6), the controller 600 may continue the damping force control to reduce the change in behavior of the vehicle 10. Accordingly, the control method of the vehicle according to the exemplary embodiment of the present invention may reduce vibration (pitch rate) of the vehicle 10 and reduce impact transmitted to the vehicle body by adjusting the damping force for each of the plurality of control sections while the vehicle 10 passes through an unevenness such as bump 20, Meanwhile, presetting control information related to the suspension 200 in a response to unevenness on the front road surface may be defined as a suspension adjustment function. In addition, the vehicle 10 may be provided with a user interface for inputting execution of the suspension adjustment function or inputting to stop execution of the preview function. FIG. 5 shows the damping force controlled by the execution of the suspension adjustment function and the pitch rate of the vehicle 10.

Referring to FIG. 7, the response of the current and the actuator applied to the driving circuit of the suspension 200 in accordance with the damping force control command shown in FIG. 6 is illustrated. That is, the controller 300 may apply a current to the driving circuit of the suspension 200 to control the actuator of the damper 220. The response time of the actuator of the damper 220 may be delayed than the time when the control current is applied by the controller 300, but the delay time is very short. The damping force may be adjusted according to the actuator operation of the damper 220.

Figure 8:
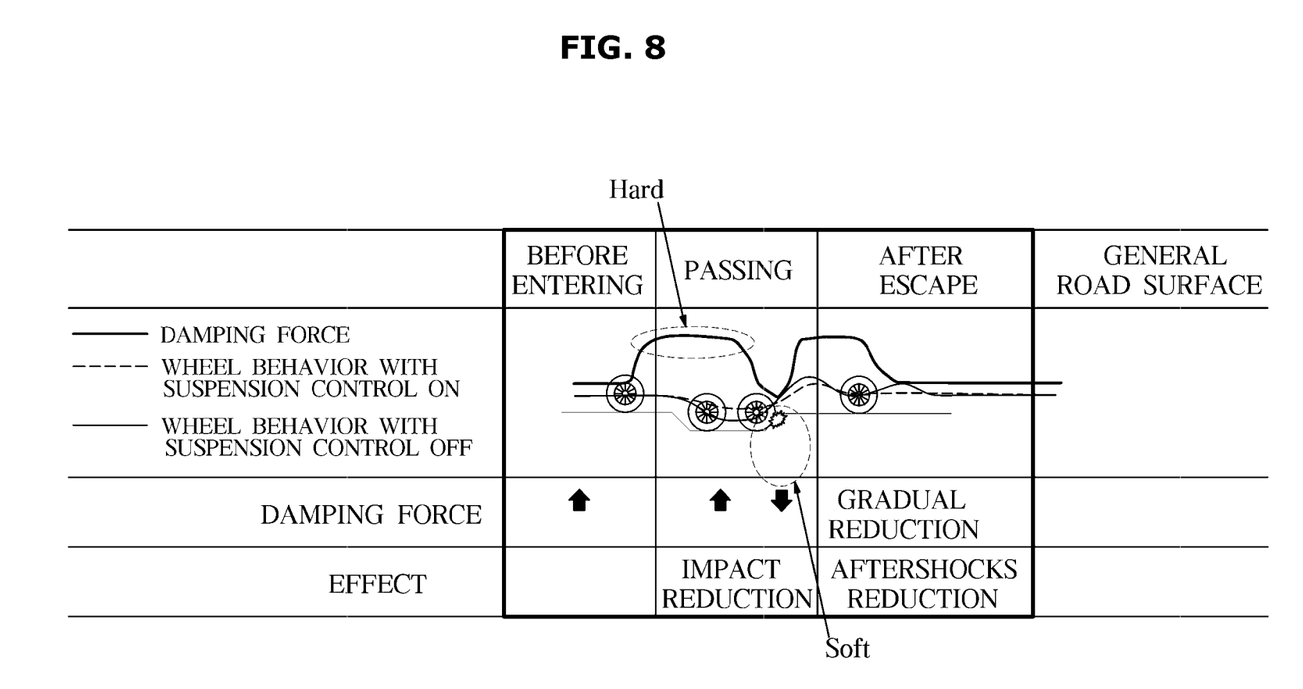
FIG. 8 illustrates a method of controlling damping force in a plurality of sections when the unevenness is a pothole.

FIG. 8 illustrates a method of controlling damping force in a plurality of sections when the unevenness is a pothole.

Figure 9:
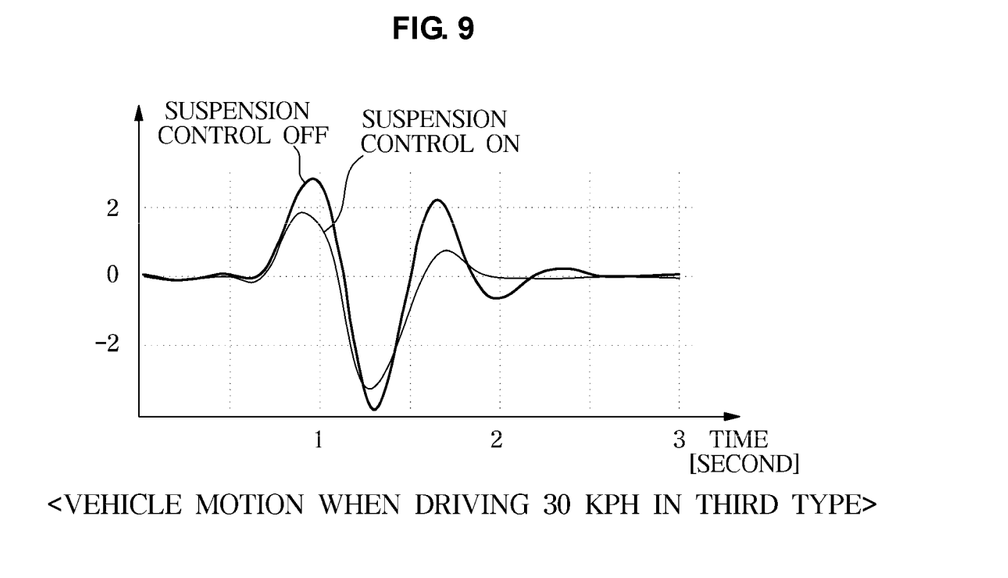
FIG. 9 illustrates an effect of reducing pitch motion when executing a vehicle control method according to an exemplary embodiment of the present invention.
Figure 10:
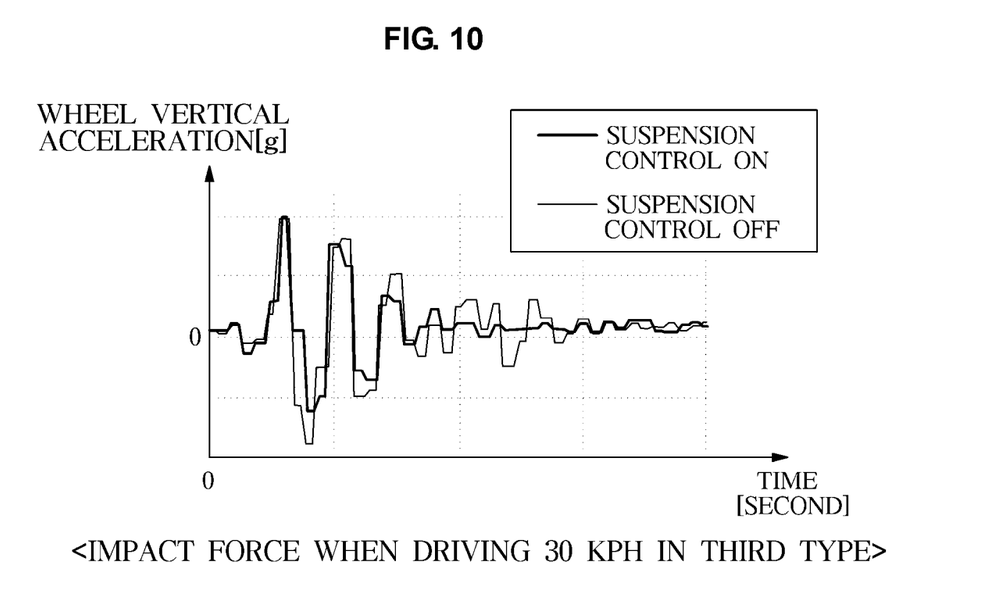
FIG. 10 illustrates an effect of reducing the impact transferred to the vehicle body when executing the vehicle control method according to an exemplary embodiment of the present invention.

Referring to FIG. 8, when the unevenness is a pothole, the controller 300 controls the suspension 200 to increase the damping force in the entry section of the pothole (hard mode). When the impact is expected in the pothole escape section, the controller 300 may control the suspension 200 to reduce the damping force in the escape section of the pothole (soft mode). When the vehicle 10 passes through the pothole, the wheel of the vehicle 10 may collide with the end portion of the pothole without touching the bottom portion of the pothole. In the instant case, the vibration of the vehicle 10 may be reduced and the impact transmitted to the vehicle body may be reduced by holding the wheel by increasing the damping force in the entry section of the pothole and by absorbing the impact by reducing the damping force in the escape section of the pothole, FIG. 9 illustrates an effect of reducing pitch motion when executing a vehicle control method according to an exemplary embodiment of the present invention. FIG. 10 illustrates an effect of reducing the impact transferred to the vehicle body when executing the vehicle control method according to an exemplary embodiment of the present invention.

FIG. 9 shows the motion of the vehicle 10 when the unevenness is the third type and the vehicle passes through the unevenness at 30 kph speed. FIG. 9 illustrates a change in vehicle motion when a vehicle control method according to an exemplary embodiment of the present invention is executed (suspension control ON) and a change in vehicle motion when a vehicle control method according to an exemplary embodiment of the present invention is not executed (suspension control OFF). The control method of a vehicle according to an exemplary embodiment of the present invention may reduce vehicle motion when the vehicle 10 passes through unevenness.

FIG. 10 shows the impact force transmitted to the wheels and/or the vehicle body 10 when the unevenness is the third type and the vehicle passes through the unevenness at a speed of 30 kph. The impact force transmitted to the wheels and/or the vehicle body may be identified by measuring the vertical acceleration of the vehicle 10. FIG. 10 illustrates a change in the vertical acceleration when the vehicle control method according to the exemplary embodiment is executed (suspension control ON) and a change in the vertical acceleration when the vehicle control method according to the exemplary embodiment is not executed (suspension control OFF). The control method of the vehicle according to the exemplary embodiment of FIG. 10 may reduce the impact force transmitted to the wheels and/or the vehicle body when the vehicle 10 passes through the unevenness.

Meanwhile, the processor 310 included in the controller 300 may generate a control signal for controlling the operation of the vehicle 10 based on the programs, instructions, and data stored in the memory 320. In this end, the memory 320 may store at least one instruction configured to cause the processor 310 to identify unevenness on a front road surface based on the detecting data and to control the suspension 200 based on damping force setting information corresponding to the unevenness when the vehicle reaches the unevenness As described above, the disclosed vehicle and control method thereof may reduce vibrations generated when the vehicle passes through unevenness and reduce the impact transmitted to the vehicle body by identifying the unevenness on the front road surface using a camera configured for acquiring road surface information, and controlling the suspension using damping force setting information corresponding to the identified unevenness (bump). Therefore, the stability of the vehicle may be secured and the ride comfort of the occupant may be improved.

The disclosed vehicle and control method thereof may reduce vibrations generated when the vehicle passes through unevenness and reduce the impact transmitted to the vehicle body by identifying the unevenness on the front road surface using a sensor configured for acquiring road surface information, and controlling the suspension using damping force setting information corresponding to the identified unevenness (bump). Therefore, the stability of the vehicle may be secured and the ride comfort of the occupant may be improved.

Meanwhile, the disclosed exemplary embodiments may be implemented in a form of a recording medium storing instructions that are executable by a computer. The instructions may be stored in a form of a program code, and when executed by a processor, the instructions may generate a program module to perform operations of the disclosed exemplary embodiments. The recording medium may be implemented as a computer-readable recording medium.

The computer-readable recording medium may include all kinds of recording media storing commands that may be interpreted by a computer. For example, the computer-readable recording medium may be ROM, RAM, a magnetic tape, a magnetic disc, flash memory, an optical data storage device, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
    a sensor configured to acquire detecting data including road surface information;
    a suspension including an elastic member and a damper; and
    a controller including a processor and a memory connected to the sensor and the suspension;
    wherein the controller is configured to identify an unevenness of a road surface based on the detecting data, to estimate a length and a height of the unevenness based on the detecting data, to acquire damping force setting information corresponding to the estimated length and the estimated height of the unevenness from the memory, and to control the suspension based on the damping force setting information corresponding to the unevenness upon determining that the vehicle reaches the unevenness,
    wherein the damping force setting information includes first data about a plurality of control sections set based on the length and the height of the unevenness and second data about damping force set for each of the plurality of control sections,
    wherein, based on determining that the unevenness is a bump, the controller is configured to control the suspension to:
        reduce the damping force to a second predetermined damping force when the vehicle enters a first boundary section between the road surface and an entry point of the bump,
        increase the damping force to a first predetermined damping force when the vehicle enters an intermediate section located between the first boundary section and a second boundary section of an escape point of the bump, and
        reduce the damping force to a third predetermined damping force when the vehicle enters the second boundary section,
    wherein the second predetermined damping force is lower than the third predetermined damping force and the third predetermined damping force is lower than the first predetermined damping force.

2. The vehicle according to claim 1, wherein the controller is configured to control the suspension to increase the damping force in an entry section of a pothole upon determining that the unevenness is the pothole and to control the suspension to reduce the damping force in an escape section of the pothole upon determining that an impact is expected in the escape section of the pothole.

3. The vehicle according to claim 1, wherein the controller is configured to estimate a distance from the vehicle to the unevenness and a time for the vehicle to reach the unevenness.

4. A method of controlling a vehicle, the method comprising:
    acquiring detecting data including road surface information;
    identifying, by a controller, an unevenness of a road surface based on the detecting data;
    estimate a length and a height of the unevenness based on the detecting data;
    acquire damping force setting information corresponding to the estimated length and the estimated height of the unevenness from a memory;
    controlling, by the controller, a suspension based on damping force setting information corresponding to the unevenness upon determining that the vehicle reaches the unevenness
    wherein the damping force setting information includes first data about a plurality of control sections set based on the length and the height of the unevenness and second data about damping force set for each of the plurality of control sections,
    wherein, based on determining that the unevenness is a bump, the controlling the suspension includes:
        reducing the damping force to a second predetermined damping force when the vehicle enters a first boundary section between the road surface and an entry point of the bump;
        increasing the damping force to a first predetermined damping force when the vehicle enters an intermediate section located between the first boundary section and a second boundary section of an escape point of the bump; and
        reducing the damping force to a third predetermined damping force when the vehicle enters the second boundary section, and
    wherein the second predetermined damping force is lower than the third predetermined damping force and the third predetermined damping force is lower than the first predetermined damping force.

5. The method according to claim 4, wherein the controlling the suspension includes:
    controlling the suspension to increase the damping force in an entry section of a pothole upon determining that the unevenness is the pothole; and
    controlling the suspension to reduce the damping force in an escape section of the pothole upon determining that an impact is expected in the escape section of the pothole.

6. The method according to claim 4, wherein the identifying the unevenness includes:
    estimating a distance from the vehicle to the unevenness and a time for the vehicle to reach the unevenness.

* * * * *